United States Patent [19]

Morita et al.

[11] 4,363,725
[45] Dec. 14, 1982

[54] APPARATUS FOR REMOVING GRAVEL FROM EXCAVATED SOIL

[75] Inventors: Takeshi Morita; Kiyoshi Morita, both of Furano, Japan

[73] Assignee: Kabushiki Kaisha Morita Kouken, Japan

[21] Appl. No.: 292,443

[22] Filed: Aug. 14, 1981

[30] Foreign Application Priority Data

Aug. 18, 1980 [JP] Japan .................................. 55-113641
Feb. 25, 1981 [JP] Japan ............................. 56-25542[U]

[51] Int. Cl.³ ............................................... B07B 1/28
[52] U.S. Cl. ..................................... 209/257; 209/421; 209/398; 209/400
[58] Field of Search ............... 209/421, 420, 257, 398, 209/400; 171/123, 124

[56] References Cited

U.S. PATENT DOCUMENTS

| | | | |
|---|---|---|---|
| 2,814,387 | 11/1957 | McWilliams | 209/421 |
| 2,864,561 | 12/1958 | Mork | 209/420 |
| 3,439,806 | 4/1969 | Kass et al. | 209/420 |
| 3,701,422 | 10/1972 | Downey | 209/421 |
| 4,083,775 | 4/1978 | Stewart et al. | 209/421 |
| 4,256,572 | 3/1981 | Read | 209/420 |

FOREIGN PATENT DOCUMENTS

| | | | |
|---|---|---|---|
| 1345485 | 10/1963 | France | 209/421 |
| 2412663 | 7/1979 | France | 209/421 |
| 689917 | 4/1953 | United Kingdom | 209/421 |

Primary Examiner—Tim R. Miles
Attorney, Agent, or Firm—Cantor and Singer

[57] ABSTRACT

An apparatus for removing stone and gravel from excavated soil by vibration. The apparatus is particularly useful for operation at the foot of a volcano, mountainous district or the like. Characteristic features of the apparatus are that it is self-propelled by means of endless tracks and the excavated soil is separated into stone, gravel and soil with the aid of a sieving means and the separated stone and gravel are discharged from the apparatus by way of a conveyor, while the separated fine soil is conveyed by way of another conveyor and then is scattered rearward by means of a scattering device to be piled up on the working ground.

17 Claims, 8 Drawing Figures

FIG. I

APPARATUS FOR REMOVING GRAVEL FROM EXCAVATED SOIL

BACKGROUND OF THE INVENTION

The present invention relates to an apparatus for removing stone and gravel contained in excavated soil by a sieving operation.

As is well known, soil at the foot of a volcano, mountainous land or the like contains a lot of stone and gravel. Unless stone and gravel are removed therefrom, there is no possibility of utilizing such a vast area as arable land, meadow or the like. Heretofore, land improvement works including removal of stone and gravel from excavated soil have usually been conducted in the following manner.

First, waste land is excavated with the aid of a power shovel or the like. Next, the excavated soil is sifted to separate stone and gravel therefrom and then the sieved soil is conveyed back to the working land. Finally, a levelling operation is performed.

Typically, a rock picker, stone picker, stone collector or the like has been employed for carrying out a series of operations as mentioned above. But all of the conventional apparatus are constructed such that land excavation and removal of stone and gravel are carried out while the apparatus is being hauled or pulled by means of another power vehicle. Thus, the conventional machines have drawbacks that removal of stone and gravel is limited only within the surface layer of the ground and the removing operation is, therefore, conducted at a reduced efficiency.

Specifically, the conventional equipment is designed and constructed such that land excavation and removal of stone and gravel are simultaneously conducted exclusively for the purpose of ensuring a high operating efficiency, but this type of design and construction results in reduced capability in removing stone and gravel. Further, an additional drawback with the conventional equipment is that operation is performed with much difficulty on an incline, because it is hauled or pulled by means of another power driven vehicle when it is moved to another place for further operation.

SUMMARY OF THE INVENTION

Hence, the present invention is intended to obviate the drawbacks with the conventional equipment as described above. More particularly, the present invention consists in that land excavation is undertaken by means of an apparatus specially designed for excavating work and a series of operations comprising the steps of sieving excavated soil, discharging stone and gravel and conveying separated fine soil back to the working ground are automatically conducted by means of the apparatus in accordance with the present invention.

Thus, it is a principal object of the present invention to provide an improved gravel removing apparatus by means of which the gravel removing operation is carried out at a very high efficiency.

It is another object of the present invention to provide a gravel removing apparatus which is self-propelled so that continuous gravel removing can be effected and in which an inclination angle of a sieving means is adjustable so that the apparatus can be operated even on an incline and, moreover, the optimum sieving effect is ensured in dependence on the nature of the soil to be sieved.

It is another object of the present invention to provide a gravel removing apparatus in which soil adhesively stuck to stone and gravel can be effectively removed by means of the sieve and the sieved soil is transferred by way of a conveyor and then scattered rearward with the aid of a scattering device whereby the apparatus is constructed of a relatively small size with the shortened conveyor mounted therein.

In order to realize the above-mentioned objects there is proposed in accordance with the present invention a gravel removing apparatus which essentially comprises in combination a chassis having endless tracks, a frame structure mounted upright on said chassis, a sieving means resiliently supported on the chassis at a certain inclination within said frame structure, said sieving means being formed with a loading port at the upper part thereof, vibration motors firmly secured to the side plates of the sieving means to vibrate the latter, and two conveyors arranged below the sieving means, one of them serving to convey stone and gravel in the forward direction and the other one serving to convey soil in the rearward direction, the lower ends of said conveyors being located adjacent to one another.

The sieving means in constructed such that it has a bottom which comprises a perforated member or the like. Typically, a wire mesh or perforated plate is employed for the perforated member.

Alternatively, the sieving means may have have a bottom which essentially comprises a plurality of longitudinally extending partitions arranged in an equally spaced relation and a number of longitudinally extending elastic wire rods located below said partitions to divide the space between the adjacent partitions into the required number of sections.

It is to be noted that the sieving means constructed of the partitions and wire rods in the above-described manner has advantageous features that there is very little possibility of causing the holes of the sieve to be clogged with stone and gravel owing to the arrangement that the bottom of the sieving means is divided only in the lateral direction and moreover soil adhesively stuck to stone and gravel are effectively removed due to the resiliency of the wire rods on which the stone and gravel spring up repeatedly.

As long as the apparatus is operated on flat land, there is no necessity for adjusting the inclination angle of the sieving means during the operation of the apparatus. However, by constructing the apparatus in such a manner that an inclination angle of the sieving means can be adjusted as required, the following advantageous feature is ensured.

When the gravel removing apparatus is operated on a slope or an incline, the inclination angle of the sieving means is adjusted until it has the same inclination angle relative to the ground that it would have if the apparatus were operated on a flat, or relatively horizontal surface. Thus, the same sieving effect is achieved as that in the latter mentioned case.

Further, by adjusting the inclination angle of the sieving means in dependence on the composition rate of the stone and gravel contained in the excavated soil and the nature of the latter, the time required for the sieving operation can be controlled in an optimum manner. Thus, sieving is effected at a high efficiency no matter what kind of soil is to be sifted.

After completion of the sieving operation soil is transported to the working ground by way of a conveyor. Heretofore, a long conveyor has been required in order to deposit or pile up sieved soil on an area remote from the gravel removing equipment without any interference with excavating work. To meet the requirement for a short conveyor the apparatus in accordance with the present invention is provided with a soil scattering device in the vicinity of the conveyor.

The scattering device makes it possible to throw soil to a position remote from the apparatus where it is deposited or piled up irrespective of the fact that the conveyor has a short length. Thus it is ensured that the whole gravel removing apparatus is designed and constructed in a small size.

Furthermore, an adjustment mechanism for adjusting the mounting angle of the scattering device may be provided so that conveyed soil is thrown out exactly to the location where it is deposited or piled up.

By changing the mounting angle of the soil scattering device with the aid of the adjustment mechanism as described above, it is possible to control the direction of throwing conveyed soil. Thus, it is possible to change the location where soil is to be deposited or piled up.

It should, of course, be understood that the gravel removing apparatus in accordance with the present invention is utilized not only for a gravel removing operation at the foot of a volcano, mountainous land or the like, but also for a sieving operation for separating soil from stone on a dry river bed or the like.

Other objects and advantageous features of the present invention will be partly obvious and partly understood from the reading of the following description made in conjunction with the accompanying drawings.

BRIEF DESCRIPTION OF THE DRAWINGS

Now the present invention will be described in more detail with reference to the accompanying drawings which illustrate preferred embodiments of the invention, in which.

DETAILED DESCRIPTION OF THE INVENTION

Figure 1:
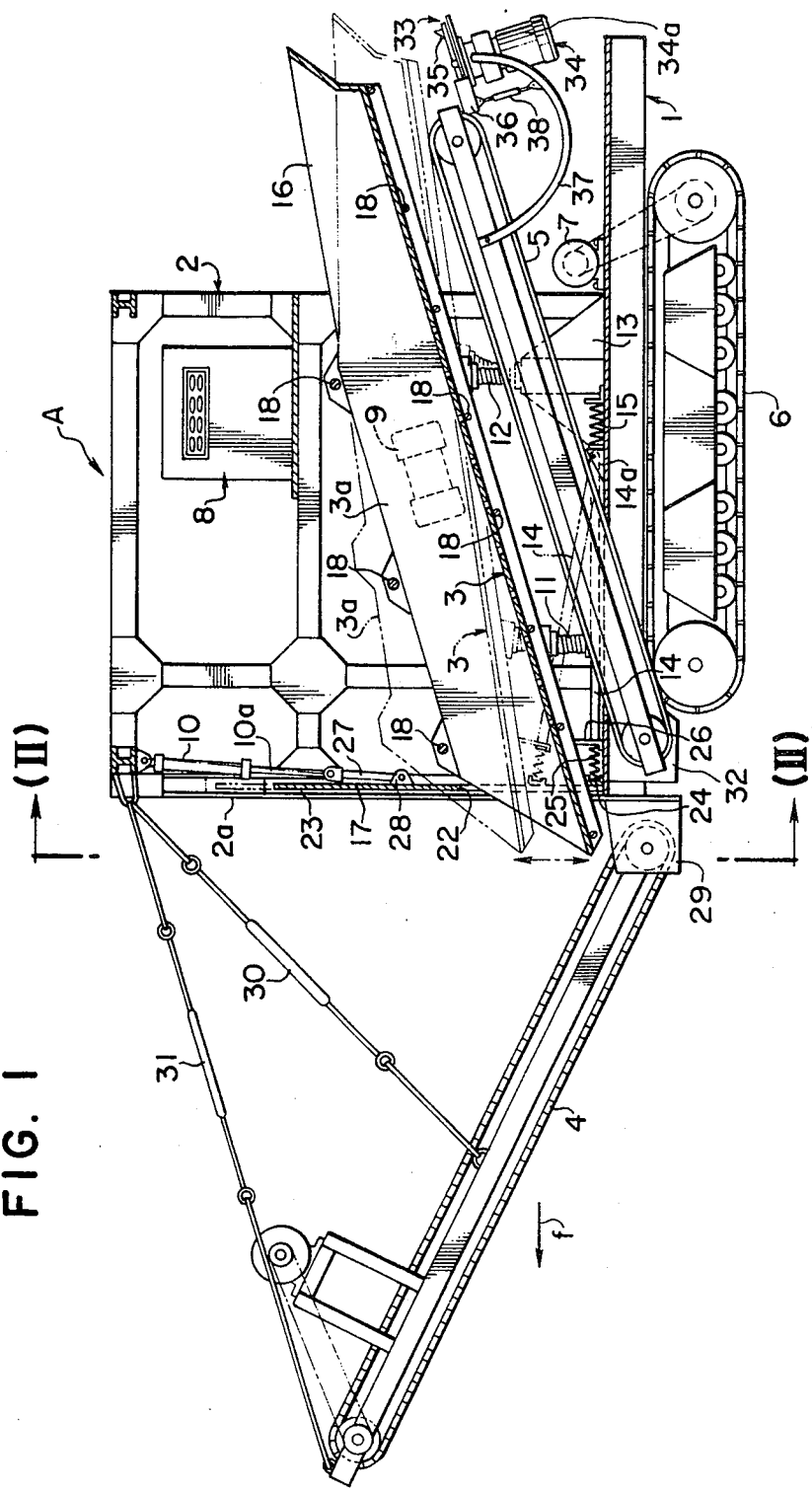
FIG. 1 is a side elevational view in cross-section of an apparatus in accordance with the present invention.

Referring to FIG. 1, a gravel removing apparatus generally designated by the reference letter A essentially comprises a chassis 1, a frame 2, a sieve 3 and two conveyors 4 and 5. The chassis 1 is provided with endless tracks 6 which allow the apparatus A to be self-propelled.

The reference numeral 7 designates a hydraulic motor which serves to drive the endless tracks 6. The hydraulic motor 7 is mounted on the chassis 1.

The frame 2 is constructed of section steel members having an H-shaped sectional configuration. Frame 2 stands up on the chassis 1.

The reference numeral 8 designates a power driven generator which is mounted on the frame 2. Particularly, the generator 8 serves as a driving power source for motors and pumps such as a vibration motor 9 for vibrating the sieve 3 as will be described later, motors for driving conveyors 4 and 5, a motor 34 for driving a scattering device 33, a hydraulic cylinder 10 for adjusting the tilting angle of the sieve 3 and a hydraulic pump for actuating the motor 7 which serves to drive the endless tracks 6.

The sieve 3 is constructed of two side plates 3a oppositely arranged in a spaced relation and a perforated bottom member in the form of steel mesh or perforated plate.

It is to be noted that the mesh size of the steel mesh or perforated member for the bottom of the sieve 3 is dimensioned in conformance to the required sieving accuracy. Further it is to be noted that perforations may be designed in the form of round holes, elongated holes or the like, when a perforated plate is employed for the bottom member.

Alternatively, the perforated bottom member may be constructed of two perforated plates superimposed one above the other, either one of said two perforated plates being slidable so as to adjust an apparent mesh size which is obtainable by their relative displacement. As a result the sieving accuracy can be adjusted as desired.

The sieve 3 is located within the frame 2 and is downwardly inclined in the advancing direction of the apparatus A, that is, the direction indicated by arrow f in FIG. 1, and is resiliently supported on the chassis 1.

Particularly, in order to resiliently support the sieve 3 on the chassis 1 spring means 11 and 12 in the form of coil springs are employed.

The coil springs 11 and 12 are located in position at the front and rear parts of the sieve 3 to support the latter at the underside of both the side plates 3a in such a manner that the vibration of the sieve 3 caused by vibration motor 9 as will be described later is not transmitted to the chassis 1 and the frame 2. Thus, it is ensured that the sieve is vibrated in the optimum manner.

The rear coil spring 12 is firmly secured to the chassis 1 with the aid of a supporting member 12, and as will be described later, the sieve 3 is adapted to tilt together with the coil spring 12 which serves as a support point whereby the tilting angle of the sieve is adjusted.

On the other hand, the front coil spring 11 is supported on the chassis 1 with the aid of a supporting rod 14.

The supporting rod 14 is secured to the upper surface of the chassis 1 by means of a fitting 14a at the rear end thereof in such a manner as to be slidable back and forth and, furthermore, be pivotable. Further, the supporting rod 14 is secured to a slide plate 17 as will be described later at the front end thereof so that as the sieve 3 tilts, the supporting rod 14 swings upward while maintaining the predetermined distance from the bottom of the sieve 3. Thus, the optimum resilient support is ensured for the sieve 3.

The reference numeral 15 designates a coil spring which is arranged to be connected to the rear end of the supporting rod 14 by way of a fitting 14a and a mounting bracket. The coil spring 15 serves to thrust the supporting rod 14 in the forward direction when the latter tilts. As desired, a suitable means for adjusting the thrust force of the coil spring 15 may be provided. As described above, the sieve 3 performs the intended sieving function by way of vibration and in order to initiate vibration a vibration motor 9 is mounted.

Figure 2:
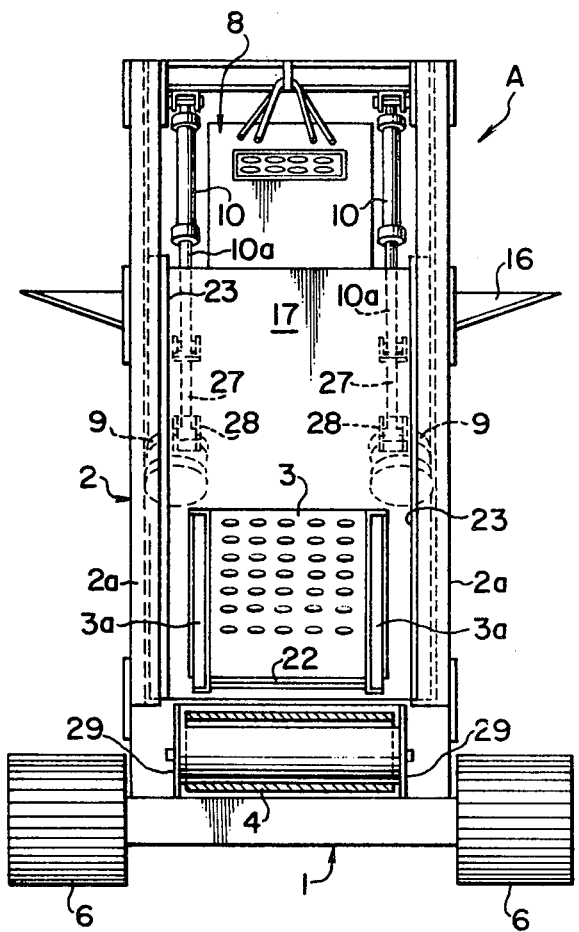
FIG. 2 is a cross-sectional view of the apparatus taken along line II—II in FIG. 1.
Figures 3, 4:
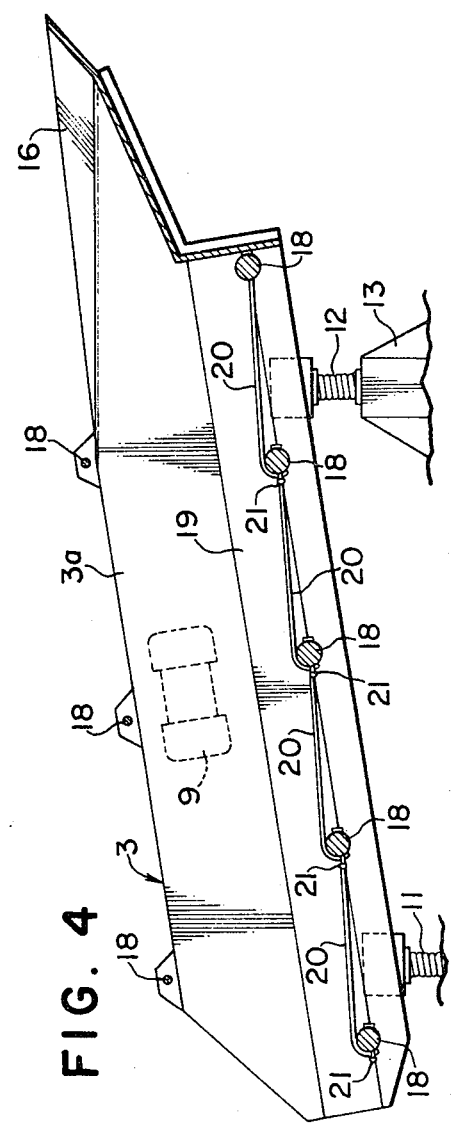
FIG. 3 is a plan view of a sieve in accordance with a modified embodiment of the invention.
FIG. 4 is a vertical view of the sieve taken along line IV—IV in FIG. 3.
Figure 5:
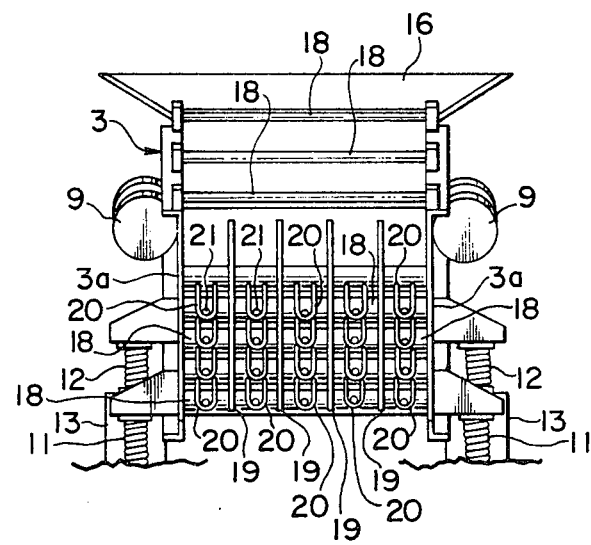
FIG. 5 is a front view of the sieve in FIG. 3.
Figure 6:
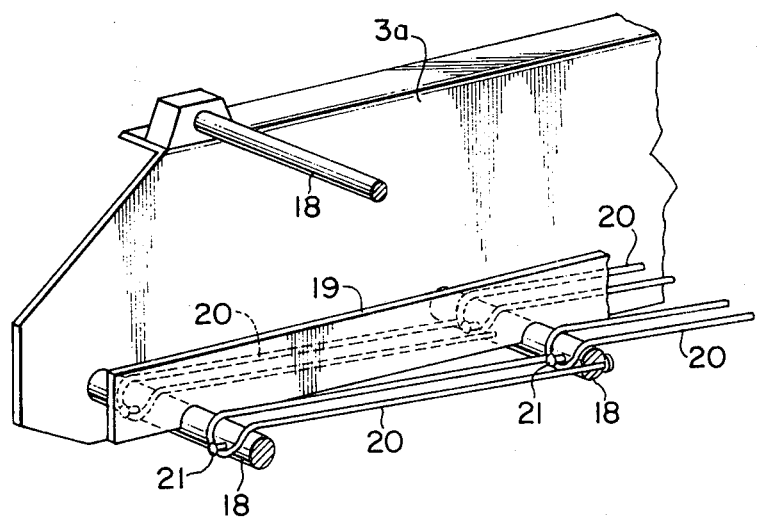
FIG. 6 is a perspective view of an essential part of the sieve in FIG. 6, shown in an enlarged scale.

In practice, a set of vibration motors 9 is firmly fixed to the outer walls of the side plates 3a of the sieve 3 (FIG. 2). As the vibration motors 9 are rotated, they generate vibration which is in turn transmitted to the sieve 3 whereby the latter is vibrated.

The reference numeral 16 designates a loading port provided adjacent to the rear end of the sieve 3. The loading port 16 protrudes rearwards from the frame 2. Alternatively, the loading port 16 may be provided separately from the sieve 3. For instance, it may be provided on the upper portion of the frame 2 in such a manner as to face toward the sieve 3. However the arrangement that the loading port 16 is integrally constructed with the sieve 3 as described above makes it possible to locate the loading port 16 in a lower position, whereby the working stroke can be minimized during the soil loading operation with the aid of a power shovel or the like.

The reference numeral 18 designates tie rods extending transversely relative to the sieve 3 so as to connect both the side plates 3a to one another at the upper and lower portions thereof. The tie rods 18 contribute to mechanical reinforcement of the whole sieve 3.

As the sieve 3 is vibrated, a lump of soil loaded on the sieve 3 via the loading port 16 is sieved in the following manner.

Specifically, the loaded soil is classified into two parts, one of them being finer soil, passes through the perforations on the bottom of the sieve 3, while the other one being coarse gravel, fails to pass therethrough and stays on the sieve 3. The fine soil falls downward of the sieve 3, whereas the coarse gravel moves down along the inclined sieve 3 and then is discharged therefrom.

Alternatively, instead of the aforesaid perforated plate other sieving means may be employed from the bottom of the sieve 3, as far as the same or equal sieving function is ensured. FIGS. 3 to 6 illustrate a sieve 3 in accordance with a modified embodiment of the invention, wherein another type of sieving means is employed.

The reference numeral 19 designates partitions. The predetermined number of partitions 19 are arranged in an equally spaced relation between both the side plates 3a whereby the width of the sieve is divided into plural longitudinal extending sections by means of the partitions 19.

The partitions 19 extend parallel to the side plates 3a over the whole length thereof and their lower parts are firmly fit onto the transversely extending tie rods 18. The reference numeral 20 designates wire rods which are located at the lower part of the partitions 20 and parallel to them to divide the space between the adjacent partitions into three sections.

The wire rods 20 are preferably made of resilient metallic material such as spring steel and are bent to a U-shaped form like a hair pin, having a length equivalent to the distance between the adjacent lower tie rods.

Specifically, the wire rods 20 are spanned between the tie rods 18 in such a manner that their one ends, that is, their open ends pass through the tie rods 18 and are fixed thereto, while the other ends are engaged to lugs 21 and the tie rods 18.

Operation of the sieve 3 constructed of a combination of the partitions 19 and wire rods 20 as described above is effected in substantially the same manner as the foregoing one. First, a mixture of soil and gravel is loaded on the sieve 3 via the loading port 16 and then the sieve 3 is vibrated. Soil containing the fine gravel therein falls down through the partitions 19, whereas coarse gravel which fails to pass stays on the partitions 19.

The coarse gravel gradually moves downward along the upper edges of the partitions 19 in the longitudinal inclined direction of the sieve 3 and is discharged out of the sieve 3.

The fine soil which passes through the partitions 20 falls down on the wire rods 20 and is sieved by vibration. Fine gravel which fails to pass through the clearance between the adjacent wire rods 20 stays thereon.

The fine gravel staying on the wire rods 20 moves downward in the same manner as the coarse gravel and is discharged out of the sieve 3. During the movement of the fine gravel it repeatedly springs up due to the resiliency of the wire rods 20 while vibration continues, whereby the soil adhesively stuck to the gravel is removed.

After completion of the sieving operation at the first stage of the partitions 19 and then at the second stage on the wire rods 20 only fine soil is sieved and falls down through the sieve assembly.

As described above, the sieve 3 is constructed such that its tilt angle can be adjusted. Specifically, the adjusting mechanism essentially comprises a slide plate 17 and a pair of hydraulic cylinders 10 which are adapted to displace said slide plate 17 upward and downward, said slide plate 17 being slidably secured to the frame 2 so as to suspend the inclined sieve 3 at the front end thereof. It is to be noted that the lower end of the slide plate 17 abuts against the upper surface of the chassis 1, resulting in prevention of the slide plate 17 from further downward displacement.

The reference numeral 22 designates a window opening which is formed at the lower part of the slide plate 17 so as to fit onto the front end portion of the inclined sieve 3. Thus, the inclined sieve 3 is suspended by the slide plate 17 at the front end thereof by way of said window opening 22.

The reference numeral 23 designates pipes welded to both the sides of the slide plate 17, said pipes 23 being slidably fitted into and supported by the steel members 2a at both the front sides of the frame 2 so as to allow the slide plate 17 to slide in the vertical direction along the steel members 2a without any danger of being tilted.

The reference numeral 24 designates a cylindrical retainer which protrudes in the horizontal direction from the rear surface of the lower portion of the slide plate 17. A coil spring 25 is mounted on said cylindrical retainer 24.

The coil spring 25 comes in abutment against a backup plate 26 which extends downward from the bottom of the sieve 3 so that it serves to prevent the sieve 3 from protruding outwards when the sieve 3 is tilted.

Specifically, since the sieve 3 is prevented from further outward displacement by means of the coil spring 25, a constant positional relation is ensured between the sieve 3 and a conveyor 4 as will be described later.

On the other hand, the upper ends of the hydraulic cylinders 10 are pivotally secured to the frame 2 and rods 10a protruding from the respective lower ends of the hydraulic cylinders 10 are pivotally connected to the rear surface of the slide plate 17 via connecting rods 27 and brackets 28.

Since the inclination angle adjusting mechanism is constructed for the sieve 3 in the above described manner, a reduced inclination angle of the sieve 3 is obtained by way of the steps of lifting the slide plate 17 and thereby raising the front end of the sieve 3.

It will be readily understood that the inclination angle adjusting mechanism for the sieve 3 as described above will be very useful where the apparatus A is operated on an incline and where the intended sieving function should be controlled in dependence on the nature of soil to be excavated.

When the apparatus A is operated on an incline, it happens that the apparatus A itself becomes inclined, resulting in an increased inclination angle of the sieve 3. In this case it is necessary to adjust the inclination angle of the sieve 3 until it is set to the proper inclination angle relative to the plane of the ground. Thus, the same sieving effect is ensured as on flat ground.

Obviously, the time required for the sieving operation varies in dependance of the nature of soil to be sieved, that is, composition rate of gravel in the soil, stickiness of the same or the like, but such sieving time can be adjusted to the soil to be sieved by changing the inclination angle of the sieve 3. Thus, the optimum sieving is ensured at a high operating efficiency no matter what kind of soil is to be sieved.

The conveyors 4 and 5 are intended to separately convey gravel and soil after completion of the sieving operation by means of the sieve 3. They are arranged end to end below the sieve 3.

Specifically, the conveyor 4 for conveying stone and gravel is constructed of a number of steel bands each of which is joined one after another whereby the required rigidity is ensured for the whole conveyor 4. Further, the conveyor 4 is secured to the chassis 1 by way of a mounting plate 29 at the lower end thereof so that it is in operational association with the sieve 3. As apparent from FIGS. 1 and 2, the conveyor 4 extends at an upward inclination in the advance direction of the apparatus A.

The reference numerals 30 and 31 designate connecting members respectively. The connecting member 30 is spanned between the middle part of the conveyor 4 and the upper part of the frame 2, whereas the connecting member 31 is spanned between the front end of the conveyor 4 and the upper part of the frame 2. Thus, the whole conveyor 4 is stably suspended from the frame 2 at an upward inclination with the aid of the connecting members 30 and 31.

On the other hand, the conveyor 5 particularly for conveying soil extends upward in the opposite direction to the aforesaid conveyor 4 and is secured to the chassis 1 by way of a mounting plate 32 at the lower end thereof. Further, the conveyor 5 is arranged substantially in parallel to the bottom surface of the sieve 3 and has substantially the same length as that of the sieve 3 inclusive of loading port 16. Thus, the whole conveyor 5 is contained within the area occupied by the chassis 1.

The reference numeral 33 designates a scattering device which is mounted adjacent to the rear end of the conveyor 5. The scattering device 33 is intended to scatter the soil conveyed from the conveyor 5 backwards.

Figure 7:
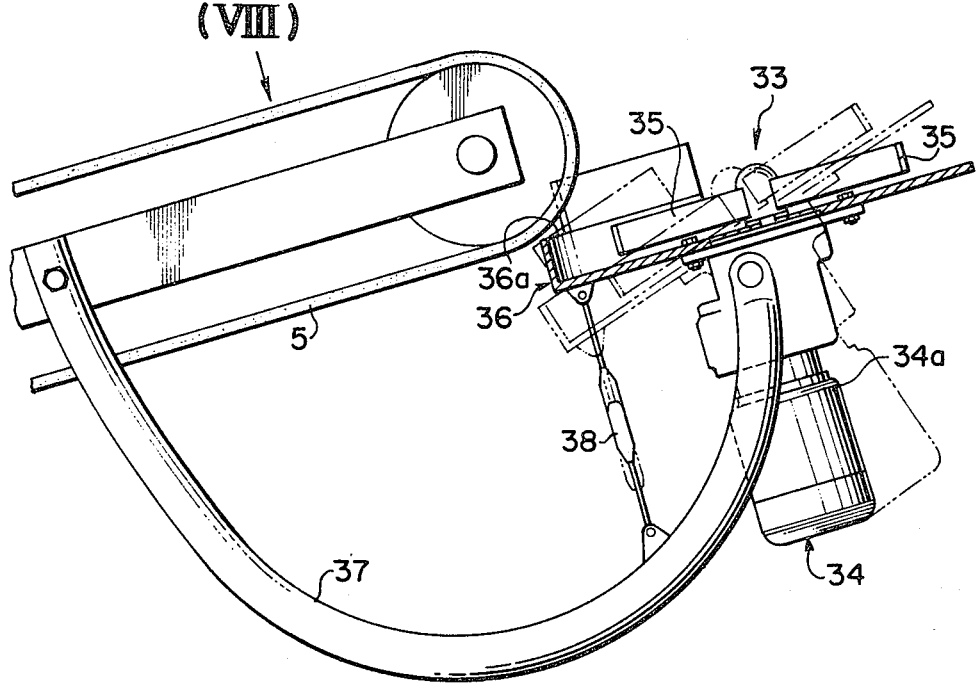
FIG. 7 is a partial sectional side view of a part of the scattering device.
Figure 8:
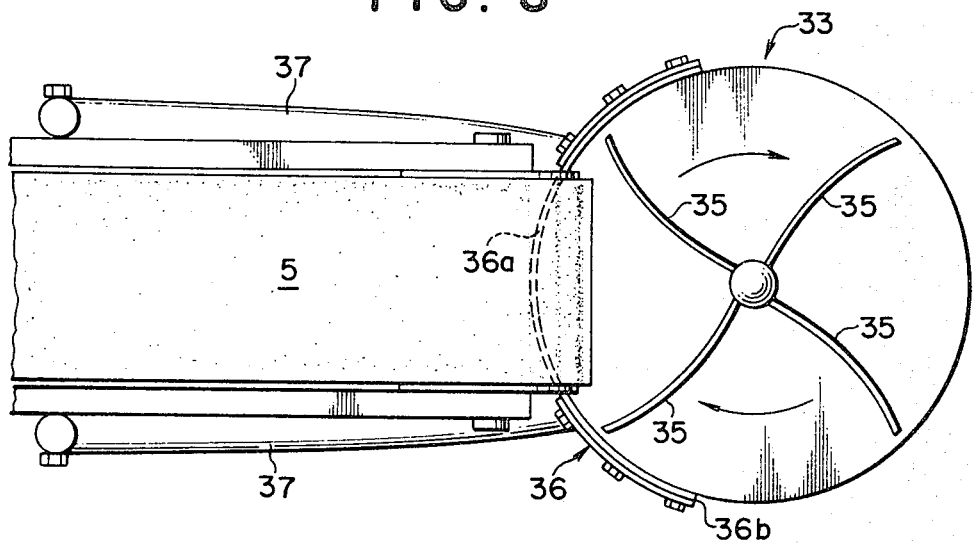
FIG. 8 is a partial plan view of the scattering device seen in the direction indicated by arrow VIII in FIG. 7.

Specifically, the scattering device 33 is designed in such a manner as to scatter the soil backwards without any necessity for extension of the conveyor 5, whereby the gravel removing apparatus A is compactly constructed. As shown in FIGS. 7 and 8, the scattering device 33 essentially comprises a motor, a plurality of radially extending blades 35 (four blades 35 are shown for ease of illustration) rotatably connected to said motor 34 and a guide frame 36 which serves to cover the bottom face of the blades 35 as well as the outer periphery of the same.

The motor 34 has a housing 34a which is pivotally supported by means of arm rods 37 fixedly secured to the side frames of the conveyor 5.

The front portion of the guide frame 36, that is, the portion corresponding to the rear end of the conveyor 5 is opened to form a stepped portion 36a so that the lower portion of the rear end of the conveyor 5 is fitted in the opening of the stepped portion 36a, while the rear portion of the outer periphery of the guide frame 36 is opened by a predetermined angle to form an opened area 36b through which the conveyed soil is scattered away.

The reference numeral 38 designates turnbuckles which are spanned between the guide frame 36 and the arm rods 37. By rotating the turnbuckles 38 the assembly of the motor 34 and the guide frame 36 is inclined up and down so as to adjust the mounting angle of the scattering device 33 whereby the soil scattering direction is controlled as required. As a result scattered soil is deposited on a predetermined area.

Now, operation of the gravel removing apparatus A in accordance with the present invention will be described below.

First, a lump of soil to be sieved is thrown into the apparatus via the loading port 16 with the aid of a power shovel or the like. As the sieve 3 is vibrated, the loaded soil is separated into stone, gravel and soil. Among them the stone and gravel are displaced downward along the upper surface of the sieve 3 by rolling thereon and then are transferred onto the conveyor 4 to be discharged therefrom.

Stone and gravel thus carried by the conveyor 4 are dumped into a carrying vehicle such as a dump car or the like which has stayed close by the upper end of the conveyor and then are transported to another place.

On the other hand, soil falls down through the screen openings of the sieve 3 onto the conveyor 5 and then is conveyed thereon until it is scattered backward by means of the scattering device 33.

When the gravel removing operation is completed around the apparatus A and, more particularly, the gravel removing operation is completed close by the chassis 1, the apparatus A runs by itself and moves to another place where the gravel removing operation starts again.

It is to be noted that soil thrown out from the scattering device 33 is piled up on the working ground and is levelled off later with the aid of a bulldozer or the like whereby a flat land surface is obtained.

Thus, ground improvement is satisfactorily achieved for land where a lot of stone and gravel are contained in the above described manner. As a result of the apparatus of the invention, it possible to utilize such waste land as arable land, a meadow or the like.

As described above, a series of gravel removing operations comprising soil sieving, stone and gravel discharging and recovered soil scattering are automatically conducted at a very high efficiency, using the apparatus in accordance with the present invention.

Further, since the apparatus is self-propelled, it can move to any place where the above-described gravel removing operation is continuously performed. Thus, it can be concluded that the apparatus has excellent workability and maneuverability which contribute to satisfactorily accomplishing the intended objects of the invention.

What is claimed:

1. An apparatus for removing gravel from excavated soil comprising a chassis having endless tracks; a frame structure mounted upright on said chassis; a sieving means resiliently supported on the chassis at a predetermined inclination within said frame structure, a loading port at the upper part thereof, and vibration motors operatively secured thereto to vibrate the same; and two inclined conveyors arranged below the sieving means, one of said conveyors serving to convey stone and gravel in the forward direction and the other of said conveyors serving to convey soil in the rearward direction, the lower ends of said conveyors being located adjacent to one another.

2. An apparatus as defined in claim 1, wherein said sieving means has a bottom which is constructed of a perforated member.

3. An apparatus as defined in claim 2, wherein said perforated member for the bottom of the sieving means comprises a sheet of wire mesh.

4. An apparatus as defined in claim 2, wherein said perforated member for the bottom of the sieving means comprises a perforated plate.

5. An apparatus as defined in claim 2, wherein a mesh size adjusting means is provided for the perforated member for the bottom of the sieving means.

6. An apparatus as defined in claim 5, wherein said mesh size adjusting means for the perforated member comprises two layers of perforated plates which are slidable relative to one another.

7. An apparatus as defined in claim 1, wherein said sieving means has a bottom which is constructed of a plurality of longitudinally extending partitions arranged in an equally spaced relation in the lateral direction and a number of longitudinal extending elastic wire rods located below said partitions in such a manner as to divide the space between the adjacent partitions into the required number of sections.

8. An apparatus as defined in claim 1, further comprising means for resiliently supported said sieving means on the chassis, said supporting means comprising a spring which is arranged between the side plate of the sieving means and the chassis.

9. An apparatus as defined in claim 1, further comprising means for adjusting the inclination angle of the sieving means.

10. An apparatus as defined in claim 9, wherein said means for adjusting the inclination angle of the sieving means comprises a spring mounted on the chassis and resiliently supporting the rear portion of the sieving means, and a slide plate connected to a hydraulic cylinder which moves said slide plate in the vertical direction slidably supporting the front portion of the sieving means.

11. An apparatus as defined in claim 10, wherein said means for adjusting the inclination angle of the sieving means further comprises a spring which is arranged between the front end of the inclined sieving means and the lower part of the slide plate, said spring serving to thrust the sieving means rearward so as to prevent the latter from protruding forward when adjusting the inclination angle.

12. An apparatus as defined in claim 9, 10, or 11, comprising a spring resiliently supporting said sieving means at the front end thereof, said spring being mounted on a supporting rod which swings in the vertical direction in accordance with the adjusted inclination of the sieving means.

13. An apparatus as defined in claim 12, wherein said supporting rod is pivotally and slidably mounted at one end thereof to said chassis.

14. An apparatus as defined in claim 1, further comprising a scattering device in the vicinity of the rear end of the conveyor for conveying the sieved soil so as to receive the sieved soil from the same and then scatter it rearwardly.

15. An apparatus as defined in claim 14, wherein said scattering device comprises a plurality of radially extending blades which are driven by a motor and a guide frame which covers the bottom face of said blades and a front half portion of the scattering device.

16. An apparatus as defined in claim 14, wherein means for adjusting the mounting angle of the scattering device is provided for the latter.

17. An apparatus as defined in claim 16, wherein said means for adjusting the mounting angle of the scattering device is constructed such that the scattering device is pivotally supported by means of arm rods which are firmly secured to the side frame of the conveyor and said arm rods and the scattering device are adjustably connected by way of turnbuckles which are spanned therebetween.

* * * * *